(12) United States Patent
Alecu et al.

(10) Patent No.: US 11,118,698 B2
(45) Date of Patent: Sep. 14, 2021

(54) DAMPING MECHANISM FOR VALVES

(71) Applicant: PRATT & WHITNEY CANADA CORP., Longueuil (CA)

(72) Inventors: Daniel Alecu, Brampton (CA); Roberto Brito, Beloeil (CA); Kimberley Ann Macdonald, Milton (CA); Patrick Beauchamp, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 323 days.

(21) Appl. No.: 16/042,314

(22) Filed: Jul. 23, 2018

(65) Prior Publication Data
US 2020/0025301 A1    Jan. 23, 2020

(51) Int. Cl.
F16K 17/04 (2006.01)
F16K 17/06 (2006.01)

(52) U.S. Cl.
CPC ........ F16K 17/0466 (2013.01); F16K 17/065 (2013.01); *Y10T 137/785* (2015.04)

(58) Field of Classification Search
CPC ............. Y10T 137/785; F16K 17/0466; F16K 17/065
See application file for complete search history.

(56) References Cited

U.S. PATENT DOCUMENTS

| | | | | |
|---|---|---|---|---|
| 2,268,227 A | * | 12/1941 | Rose | F16K 17/065 137/469 |
| 2,583,295 A | * | 1/1952 | Greer | B60T 11/32 251/16 |
| 3,848,632 A | * | 11/1974 | Powell | F16K 17/0433 137/514 |
| 4,027,474 A | * | 6/1977 | Demase | F02C 7/228 60/39.281 |
| 4,250,916 A | * | 2/1981 | Hoffmann | F16K 1/126 137/514.5 |
| 4,552,172 A | | 11/1985 | Krieger et al. | |

(Continued)

FOREIGN PATENT DOCUMENTS

| CH | 396548 A | 7/1965 |
|---|---|---|
| DE | 102010003192 A1 | 9/2011 |

(Continued)

OTHER PUBLICATIONS

EP search report issued in counterpart European application No. 19187951.9 dated Dec. 9, 2019.

*Primary Examiner* — Marina A Tietjen
*Assistant Examiner* — Frederick D Soski
(74) *Attorney, Agent, or Firm* — Norton Rose Fulbright Canada LLP

(57) ABSTRACT

A valve has a housing having an inlet and an outlet. A valve element is biased towards a closed position in which the valve element restricts fluid flow from the inlet to the outlet. The valve element is axially movable by fluid pressure at the inlet towards an open position in which the inlet is in fluid flow communication with the outlet. The valve further has a damping chamber having a metering orifice in fluid communication with the inlet. The damping chamber has an axially facing surface defined by the valve element and having a variable volume varying from a minimum volume when the valve element is in its closed position to a maximum volume when the valve element is in its open position.

16 Claims, 3 Drawing Sheets

(56) References Cited

U.S. PATENT DOCUMENTS

| | | | | |
|---|---|---|---|---|
| 4,724,866 A | * | 2/1988 | Bates | F16K 47/00 137/498 |
| 4,742,846 A | * | 5/1988 | DiBartolo | F16K 17/065 137/469 |
| 5,174,545 A | * | 12/1992 | Blais | F04D 27/0215 251/33 |
| 5,381,823 A | * | 1/1995 | DiBartolo | F16K 17/065 137/494 |
| 5,417,054 A | * | 5/1995 | Lee | F02B 77/04 239/406 |
| 6,082,113 A | * | 7/2000 | Prociw | F23C 7/002 60/748 |
| 6,142,176 A | * | 11/2000 | Sagawa | F16K 17/082 137/514 |
| 8,191,573 B2 | | 6/2012 | Voss | |
| 8,360,337 B2 | * | 1/2013 | Vijay | B08B 3/026 239/4 |
| 9,062,644 B2 | | 6/2015 | Erb | |
| 9,447,733 B2 | * | 9/2016 | Belleville | F02C 7/228 |
| 2006/0185650 A1 | * | 8/2006 | Kaneko | F02M 59/368 123/506 |
| 2011/0114203 A1 | * | 5/2011 | Mazzoni | F16K 17/06 137/514 |
| 2012/0048398 A1 | * | 3/2012 | Schudt | F16K 31/0613 137/514 |
| 2012/0199523 A1 | * | 8/2012 | Bauer | F16T 1/14 210/136 |
| 2013/0025712 A1 | * | 1/2013 | Thiele | H01R 9/26 137/514 |
| 2013/0233409 A1 | * | 9/2013 | Grawunde | F15B 13/024 137/106 |
| 2013/0306166 A1 | * | 11/2013 | Erb | F02M 63/005 137/469 |
| 2014/0069529 A1 | * | 3/2014 | Matsuo | F16K 17/044 137/505.11 |
| 2014/0109585 A1 | * | 4/2014 | Rickis | F02C 7/232 60/740 |
| 2017/0139428 A1 | * | 5/2017 | Mueller | F16K 17/0466 |
| 2018/0080568 A1 | | 3/2018 | Bruck | |

FOREIGN PATENT DOCUMENTS

| | | |
|---|---|---|
| FR | 2998029 A1 | 5/2014 |
| GB | 2002497 A | 2/1979 |

* cited by examiner

DAMPING MECHANISM FOR VALVES

TECHNICAL FIELD

The application relates generally to valves and, more particularly, to damping mechanisms for valves, such as pressure relief valves and pressure regulating valves.

BACKGROUND OF THE ART

Pressure relief and pressure regulating valves are prone to sustained oscillations resulting in pressure ripples around the set valve cracking pressure, which requires a well-tuned damping mechanism.

Typically, damping is effected by pushing oil out of the spring chamber on the back side of the piston during the valve opening stroke and drawing oil back in the spring chamber during the closing stroke. If the valve oscillation results in excessive closing velocity, the liquid cavitates in the spring chamber, thereby significantly reducing the damping effectiveness. The damping effectiveness is also reduced on the opening stroke since vapor bubbles' collapsing occurs with a delay after the pressure causing the piston to move has been applied. The maximum damping of such concepts is limited by the average pressure in the back chamber, which tends to be equal to the valve dumping pressure.

There is thus a need for a new valve damping mechanism.

SUMMARY

In one aspect, there is provided a valve comprising: a housing having an axis and defining an inlet configured to be connected to a fluid line, and an outlet; a valve element biased towards a closed position in which the valve element restrict fluid flow from the inlet to the outlet, the valve element being axially movable by fluid pressure at said inlet towards an open position in which the inlet is in fluid flow communication with the outlet; a damping chamber having a metering orifice in fluid communication with the inlet irrespective of a position of the valve element, the damping chamber having an axially facing surface defined by the valve element and having a variable volume varying from a minimum volume when the valve element is in its closed position to a maximum volume when the valve element is in its open position.

In another aspect, there is provided a pressure relief valve comprising: a housing having an axis and defining an inlet configured to be connected to a fluid line, and an outlet; a piston biased towards a closed position in which the piston restricts fluid flow from the inlet to the outlet, the piston being axially displaceable by fluid pressure at the inlet towards an open position in which the inlet is in fluid flow communication with the outlet; a damping chamber having a dedicated metering orifice in fluid communication with the inlet, the dedicated metering orifice having a fixed geometry, the damping chamber having an axially facing surface defined by the valve element and having a variable volume varying from a minimum volume when the valve element is in its closed position to a maximum volume when the valve element is in its open position.

In a further aspect, there is provided a method of hydraulically damping a pressure relief valve having a piston biased towards a closed position and an inlet configured to be connected in flow communication with a fluid line, the method comprising: using the piston and a surrounding structure to define a variable volume damping chamber, and fluidly connecting the damping chamber to the inlet by means of a calibrated orifice configured to induce a turbulent flow.

DESCRIPTION OF THE DRAWINGS

Reference is now made to the accompanying figures in which.

DETAILED DESCRIPTION

Figure 1:
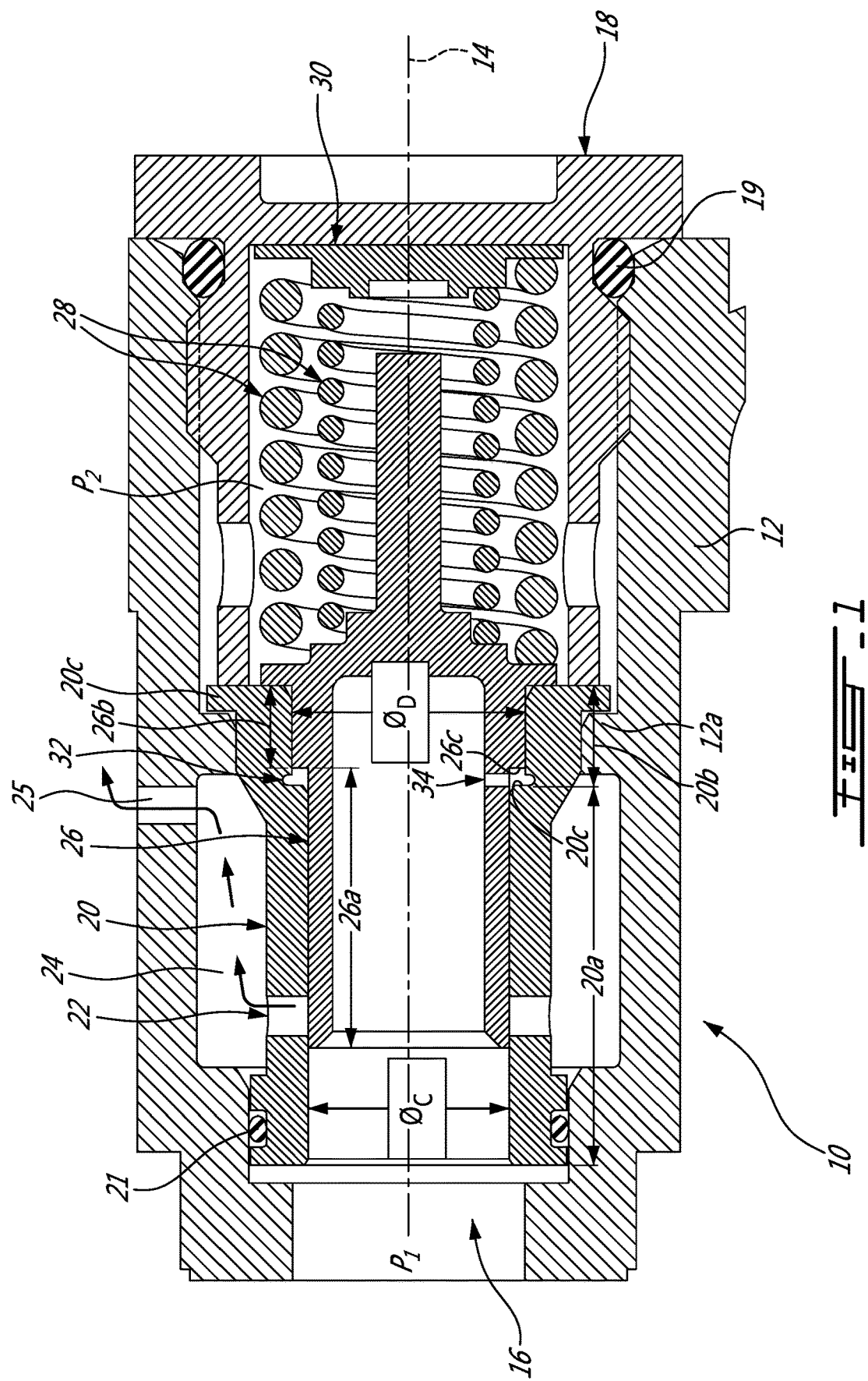
FIG. 1 is a schematic cross-section view of a pressure relief valve.

FIG. 1 illustrates a pressure relief valve suitable for use in an aircraft engine oil system. The valve 10 is designed or set to open at a predetermined set pressure (e.g. 220 psia). When the set pressure is exceeded, the relief valve 10 becomes the path of least resistance as the valve is forced open by the force exerted by the fluid pressure and a portion of the fluid is diverted through an auxiliary route.

The exemplary valve 10 comprises a valve housing 12 having an axis 14. The valve housing 12 has at a first end thereof an inlet 16 opened in the axial direction and configured to be connected to a hydraulic line (e.g. an oil line of an aircraft engine oil system). The opposed second end of the valve housing 12 (i.e. the end opposed the inlet 16) is closed by a cap 18, which can be threadably engaged with internal threads defined in the second end of the valve housing 12. An O-ring 19 or the like is provided between the cap 18 and the housing 12 to provide sealing.

Still according to the illustrated embodiment, a sleeve 20 is axially inserted in the housing 12. The sleeve 20 has a radially outer shoulder 20c at a downstream end thereof which is axially abutted on a corresponding radially inner shoulder 12a of the housing 12. An O-ring 21 is engaged in a groove at the upstream end of the sleeve 20 for sealing engagement with the inner wall of the housing 12 axially next to inlet 16. The sleeve 20 is in fluid communication with the inlet 16. The sleeve 20 has an inner diameter with a stepped profile. More particularly, the sleeve 20 has an upstream section 20a having a first inner diameter $ø_C$ and a downstream section 20b having a second diameter $ø_D$, the second diameter $ø_D$ being greater than the first diameter $ø_C$. A port opening 22 extends radially from the inner diameter to the outer diameter of the upstream section 20a of the sleeve 20. The port opening 22 is in flow communication with a release chamber 24 defined radially between the housing 12 and the sleeve 20. The release chamber 24 is in flow communication with an outlet 25 defined in the housing 12.

A valve element, such as illustrated piston 26, is slidably received in sealing engagement within the sleeve 20. A biasing mechanism is provided to urge the piston 26 to a closed position in which the piston 26 restricts fluid flow from the inlet 16 to the outlet 25. As shown in FIG. 1, the piston 26 covers the port opening 22 when urged in its closed position, thereby preventing fluid flow from the inlet 16 to the release chamber 24 and, thus, to the outlet 25. According to the illustrated embodiment, the biasing mechanism comprises a pair of concentric coil springs 28 extending between a shoulder on the back side of the piston 26 and a spacer 30 provided inside the cap 18. The springs 28 produce a closing force against the pressure P1 (which may be in the order of 220 psia depending on the intended applications) acting at the inlet 16 on the pressure side of the valve 10. The springs 28 urge the shoulder of the piston 26 axially in engagement with the downstream end of the sleeve 20, as shown in FIG. 1.

As can be appreciated from FIG. 1, the piston 26 has a hollow cylindrical body including an outer diameter surface having a stepped profile corresponding to that of the inner diameter surface of the sleeve 20. More particularly, the piston 26 has an upstream section 26a having a first outer diameter and a downstream section 26b having a second outer diameter, the second outer diameter being greater than the first outer diameter. The upstream section 26a of the piston 26 is in sealing engagement with the upstream section 20a of the sleeve 20 while the downstream section 26b of the piston 26 is in sealing engagement with the downstream section 20b of the sleeve 20. The upstream and downstream sections 26a, 26b of the piston 26 define first and second steps separated from one another by an annular forwardly axially facing shoulder 26c which axially faces a corresponding annular rearwardly axially facing shoulder 20c between the upstream and downstream stepped portions of the sleeve 20.

The axially facing annular shoulders 20c, 26c of the sleeve 20 and the piston 26 define therebetween a damping chamber 32 having a dedicated port 34 in the form of a calibrated metering orifice extending radially from an inner diameter of the upstream portion 26a of the piston 26 to an outer diameter thereof. The damping chamber 32 is radially bounded by the outer diameter surface of the upstream portion 26a of the piston 26 and the inner diameter surface of the downstream portion 20b of the sleeve 20.

The damping chamber 32 is in flow communication at all time (irrespective of the position of the piston 26) with the inlet 16 of the valve housing 12 via its dedicated metering orifice 34. The orifice 34 has a fixed geometry, including a fixed length and a fixed diameter. The size of the metering orifice 34 is precisely selected to provide the desired damping. According to one embodiment, the diameter of the orifice 34 ranges from 0.033 to 0.037 inches. According to one aspect of an embodiment, the orifice is configured to induce a turbulent flow. This may be provided by having a short orifice. For instance, the orifice may have a length over diameter ration L/D<6 and preferably L/D<1.5. The damping chamber 32 has a variable volume. The volume of the damping chamber 32 is at its minimum when the piston 26 assumes its closed position as illustrated in FIG. 1. The volume of the damping chamber 32 continuously increases during the opening stroke as the piston 26 axially moves against the force of the springs 28 under the pressure P1 of the fluid at the inlet 16 (towards the right hand side on FIG. 1). The volume of the damping chamber 32 continuously decreases during the return stroke as the piston 26 slides back towards its closed position under the force of the springs 28. The damping chamber 32 is, thus, effective during the full stroke of the piston 26. The damping chamber 32 is not part of the release flow path leading to the outlet 25 and, thus, remains effective when the valve 10 is opened. During the opening stroke, fluid from the inlet 16 at pressure P1 is drawn in the damping chamber 32. During the closing stroke, the fluid in the damping chamber 32 is pushed out via the metering orifice 34.

By so connecting the damping chamber 32 to the pressure side of the valve and, thus, continuously exposing the damping chamber 32 to pressure P1 (e.g. 220 psia) at the valve inlet 16, it is possible to have the full pressure upstream of the valve to dampen the valve 10. The amplitude of the damping can, thus, be much higher as the available forces on the pressure side are much higher than on the back side where the average pressure P2 tends to be equal to the valve dumping pressure (e.g. 2.5 psi to 14.7 psi). The damping occurs by pushing the fluid out of the calibrated orifice 34 of the damping chamber 32 on the valve closing stroke and by drawing the fluid from the inlet 16 through the orifice 34 into the damping chamber 32 on the opening stroke. By having the damping chamber 32 on the pressure side with its dedicated calibrated orifice 34, more damping can be achieved without cavitation. The higher average pressure increases the maximum possible damping (thereby avoiding cavitation). The dedicated orifice 34 allows much faster valve response to pressure fluctuation yet it limits the oscillation amplitude in the regulating range.

The use of a damping chamber with a dedicated calibrated orifice exposed to P1 for the full stroke of the piston provides for a non-linear damping coefficient, a damping mechanism which is independent of fluid viscosity and allow for a finely tuned damping. The calibrated orifice 34 provides for a turbulent flow. Applicant has found that the turbulent orifice has little impact in the low velocity range, i.e. allows the valve to open fast enough, but has large impact in the high velocity range (high frequency oscillation), i.e. stops high frequency high amplitude oscillations. An orifice with L/D<6, preferably L/D<1.5 will insure turbulent or turbulent-like flow. While in a laminar orifice the pressure loss, thus the damping, is proportional to the fluid velocity at the first power and the fluid viscosity, in a turbulent flow orifice it is proportional to the fluid density and the fluid velocity squared. For example, at low temperature and low velocity the laminar orifice would provide damping proportional to 1000 cSt×0.1 m/s=100 units, the turbulent orifice would provide 1000 kg/m^3×0.01 (m/s)^2=10 units (barring a constant). In the latter case, the valve would move faster to release the pressure. Conversely, at higher temperature and high velocity the laminar orifice would provide damping proportional to 100 cSt×1.0 m/s=100 units while the turbulent orifice 1000 kg/m^3×1.0^2 (m/s)^2=1000 units. In the latter case, the valve would be heavily dampened in case of rising oscillations. Note: the viscosity of the fluid drops rapidly with fluid temperature while the density remains almost constant (about 4% every 100 deg F. versus viscosity 2 times every 6 deg F. or 2000 times every 100 deg F., that is why viscosity is undesireable as factor in controlling the damping.

Figure 2:
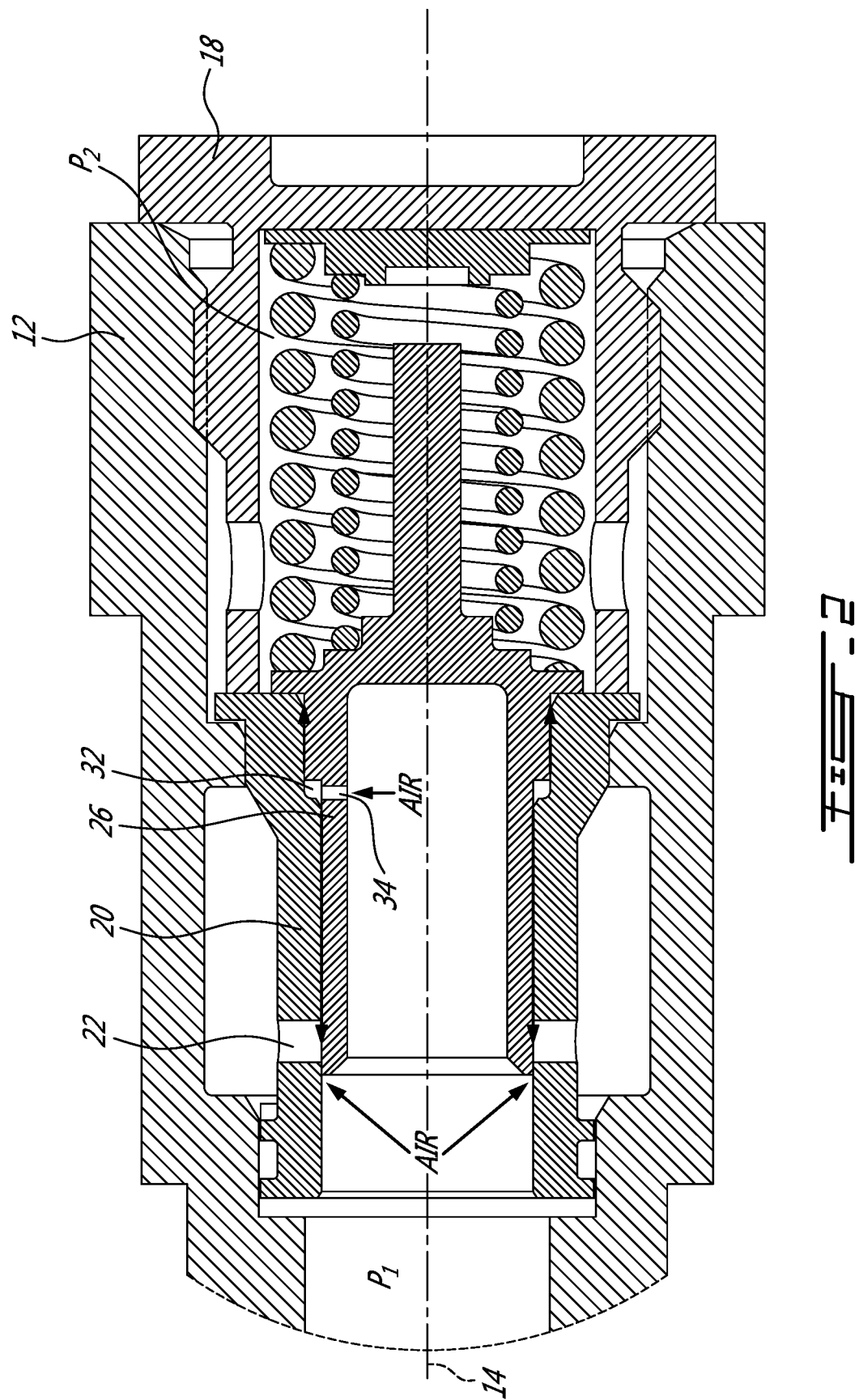
FIG. 2 is a schematic cross-section view of the valve illustrating the airtight configuration of the valve.

As schematically shown in FIG. 2, the annular damping chamber 32 traps fluid between consecutive system operating cycles (start/shutdown). The liquid fills up the piston to sleeve clearance which makes the valve air tight without requiring excessively tight clearances. This may be a significant feature for aircraft engine oil systems, which often drain between two functioning cycles or may de-prime during extreme attitude flight conditions. The air tightness of the relief valve may significantly improve the oil pressure recovery rate during start or at the end of an extreme attitude flight segment.

Also, it is worthwhile noting that the stepped sleeve 20 and piston 26 can be retrofitted to existing valves.

Figure 3:
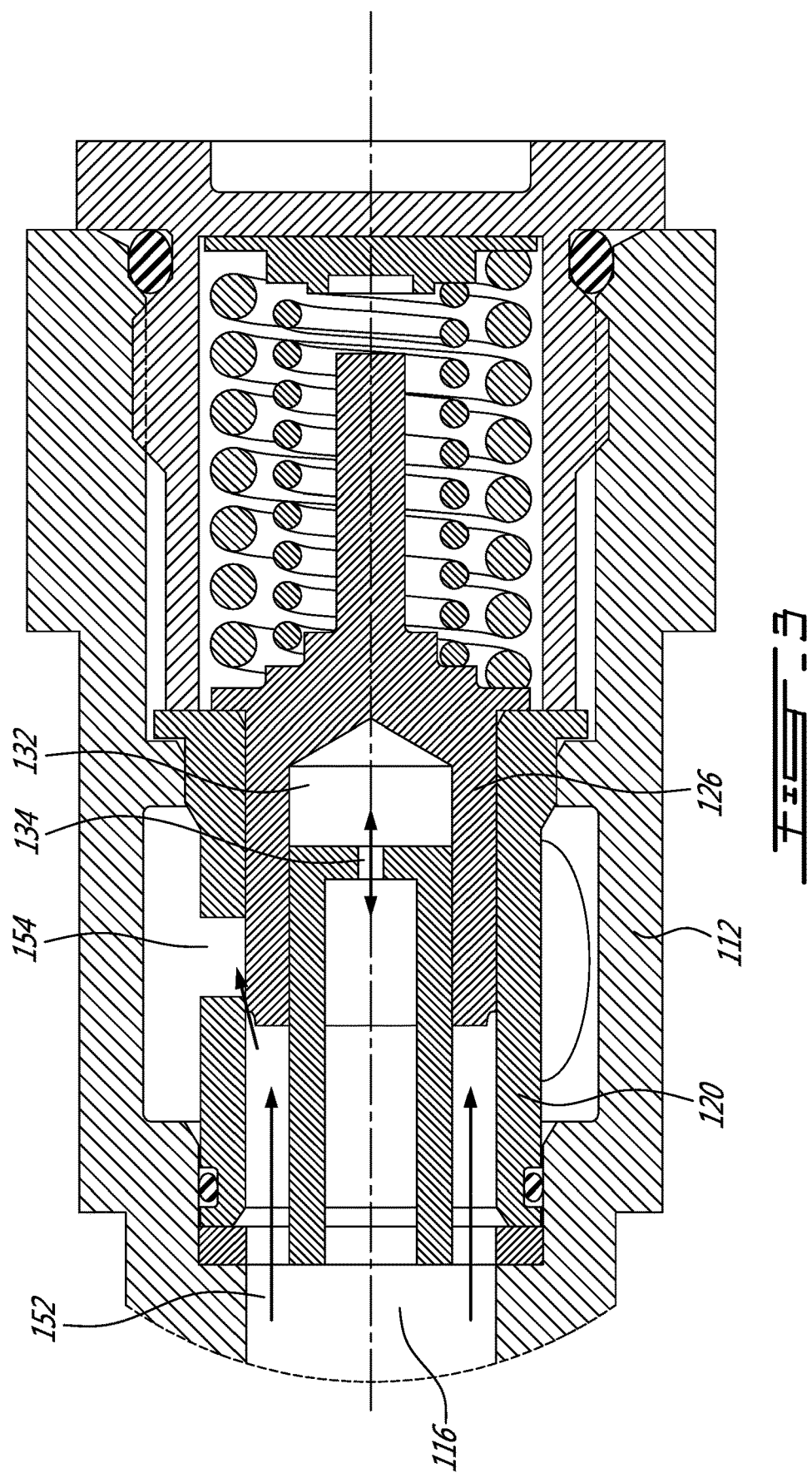
FIG. 3 is a schematic cross-section view of another embodiment of the pressure relief valve.

FIG. 3 illustrates another embodiment in which a plunger 150 has a flange clamped between the housing 112 and the sleeve 120, the plunger 150 projecting axially into the hollow cylindrical body of the piston 126 to define therewith a damping chamber 132. The calibrated orifice 134 of the damping chamber 132 is defined axially in the closed distal end of the plunger 150 and is direct flow communication with the inlet 116 of the valve. As can be appreciated from the flow arrows, the damping orifice 134 is separate from and independent of the main flow path 152 and the release flow path 154 when the valve opens. The plunger 150 can be retrofitted to existing valves. This embodiment does not require changes to the sleeve and associated piston.

The above description is meant to be exemplary only, and one skilled in the art will recognize that changes may be made to the embodiments described without departing from the scope of the invention disclosed. Any modifications which fall within the scope of the present invention will be apparent to those skilled in the art, in light of a review of this disclosure, and such modifications are intended to fall within the appended claims.

The invention claimed is:

1. A valve comprising: a housing having an axis and defining an inlet configured to be connected to a fluid line, and an outlet; a valve element biased towards a closed position in which the valve element restricts fluid flow from the inlet to the outlet, the valve element being axially movable by fluid pressure at said inlet towards an open position in which the inlet is in fluid flow communication with the outlet; a damping chamber having a metering orifice in fluid communication with the inlet irrespective of a position of the valve element, the damping chamber having an axially facing surface defined by the valve element and having a variable volume varying from a minimum volume when the valve element is in the closed position to a maximum volume when the valve element is in the open position, wherein a ratio of a length of the metering orifice to a diameter of the metering orifice is less than 1.5.

2. The valve defined in claim 1, wherein the metering orifice of the damping chamber is defined in the valve element.

3. The valve defined in claim 2, wherein the damping chamber encircles the valve element, and wherein the metering orifice of the damping chamber extends from an inner diameter of the valve element to an outer diameter thereof.

4. The valve defined in claim 3, wherein the outer diameter of the valve element has a stepped profile including a first and a second axially extending step defining therebetween an annular shoulder, the annular shoulder forming the axially facing surface of the damping chamber.

5. The valve defined in claim 4, wherein the valve element is slidably received in a sleeve mounted in the housing, and wherein the damping chamber is defined between the sleeve and the valve element.

6. The valve defined in claim 5, wherein a port is defined in the sleeve axially between the inlet and the damping chamber, the port axially spaced from and in fluid communication with the outlet of the housing.

7. The valve defined in claim 5, wherein the sleeve has a stepped inner diameter profile including a radially inner shoulder, the radially inner shoulder forming a second axially facing surface of the damping chamber.

8. The valve defined in claim 1, wherein the metering orifice is a turbulent flow orifice dedicated to the damping chamber.

9. A pressure relief valve comprising: a housing having an axis and defining an inlet configured to be connected to a fluid line, and an outlet; a piston biased towards a closed position in which the piston restricts fluid flow from the inlet to the outlet, the piston being axially displaceable by fluid pressure at the inlet towards an open position in which the inlet is in fluid flow communication with the outlet; a damping chamber having a dedicated metering orifice in fluid communication with the inlet, the dedicated metering orifice having a fixed geometry, the damping chamber having an axially facing surface defined by the valve element and having a variable volume varying from a minimum volume when the valve element is in the closed position to a maximum volume when the valve element is in the open position, wherein a ratio of a length of the metering orifice to a diameter of the metering orifice is less than 1.5.

10. The pressure relief valve defined in claim 9, wherein the metering orifice is a turbulent flow orifice dedicated to the damping chamber.

11. The pressure relief valve defined in claim 9, wherein the metering orifice of the damping chamber is defined as a hole through the valve element.

12. The pressure relief valve defined in claim 11, wherein the metering orifice of the damping chamber extends from an inner diameter of the valve element to an outer diameter thereof.

13. The pressure relief valve defined in claim 12, wherein the outer diameter of the valve element has a stepped profile including a first and a second axially extending step defining therebetween an annular shoulder, the annular shoulder forming the axially facing surface of the damping chamber.

14. A method of hydraulically damping a pressure relief valve having a piston biased towards a closed positon and an inlet configured to be connected in flow communication with a fluid line, the method comprising: using the piston and a surrounding structure to define a variable volume damping chamber, and fluidly connecting the damping chamber to the inlet by means of a calibrated orifice having a ratio of a length of the calibrated orifice to a diameter of the calibrated orifice less than 1.5 for inducing a turbulent flow.

15. The method defined in claim 14, comprising forming a surface of the damping chamber on an outer diameter of the piston.

16. The method defined in claim 15, comprising defining the calibrated orifice through the piston from an inner diameter to the outer diameter thereof.

* * * * *